July 24, 1956
L. A. RICHARDS
2,755,935
VACUUM FILTER
Filed Aug. 11, 1954
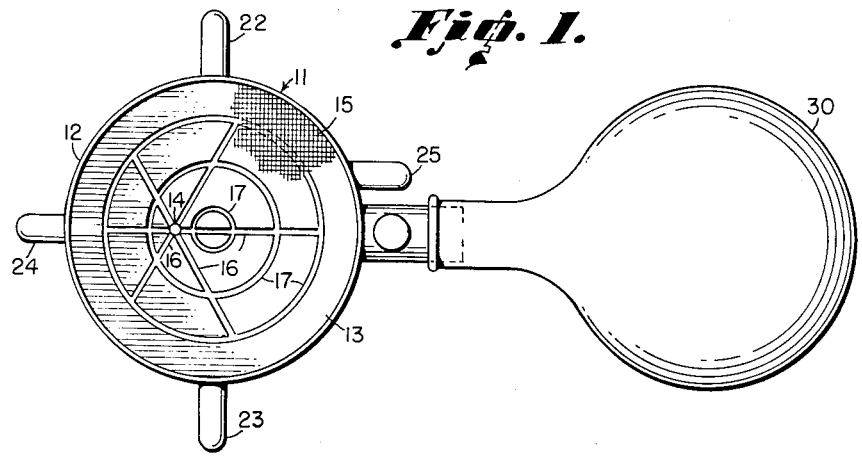
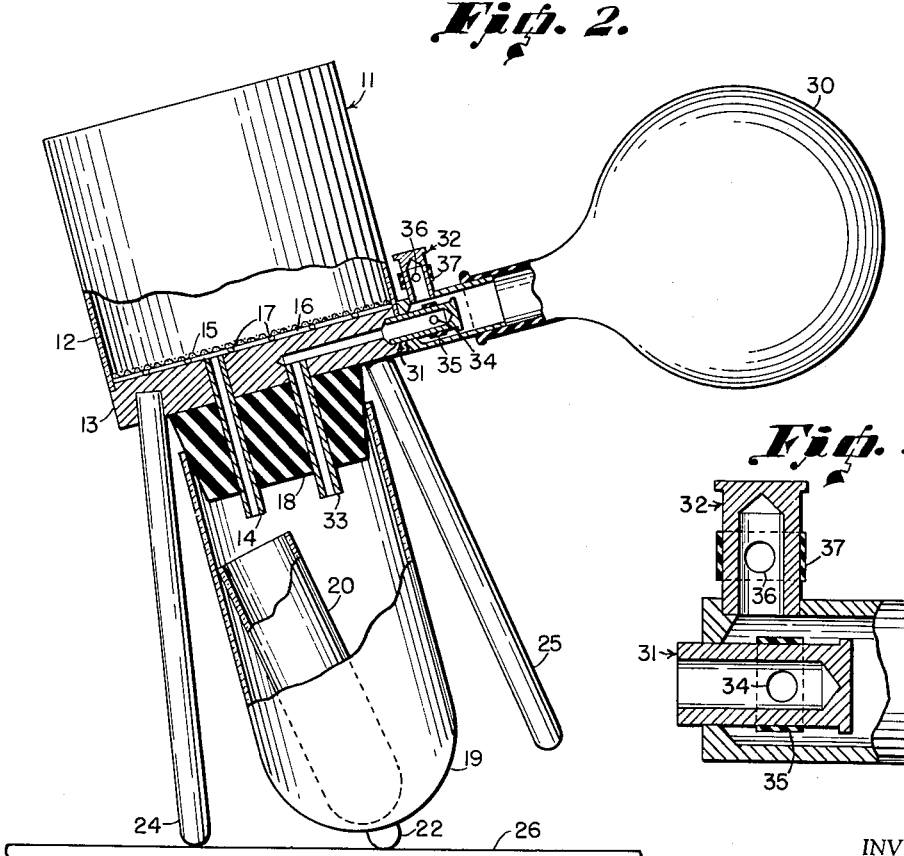
INVENTOR
L. A. RICHARDS
BY
*J. A. Seegrush*
*W. Bier* ATTORNEYS

United States Patent Office
2,755,935
Patented July 24, 1956

2,755,935

VACUUM FILTER

Lorenzo A. Richards, Riverside, Calif.

Application August 11, 1954, Serial No. 449,284

5 Claims. (Cl. 210—149)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to a vacuum filter, particularly to one having means for obtaining a selected filtrate during the filtration process.

In general according to the invention, the vacuum filter is provided with a filter funnel having a base for supporting filter paper and having a stem through which filtrate will flow and drop by gravity, this stem extending downwardly into a flush reservoir which is sealingly connected to the funnel. A collection vessel, positioned within and of smaller diameter than, the flush reservoir, having an open top spaced below the lower end of the said stem, and tiltable relative to the stem so as to receive or avoid receiving any particular filtrate discharged from the stem, is also included. Means for tilting the collection vessel to position it for receiving or avoiding filtrate discharged from the stem, and means for evacuating the flush reservoir are also provided.

In the accompanying drawing—

Fig. 1 is a top view of the vacuum filter with part broken away;

Fig. 2 is a side view with part broken away; and

Fig. 3 is an enlarged detail of the suction bulb valve structure.

Referring to the drawing, there is provided a filter funnel 11 having a wall 12, a base 13 and a stem 14 through which filtrate will flow and drop by gravity. The upper surface of base 13 for supporting filter paper 15 is provided with a plurality of longitudinal grooves 16 interconnected with circular grooves 17 and communicating with the egress aperture of stem 14 for discharge of filtrate. With this arrangement, the filter paper may be used flat and the funnel is simple to use. Also the filter cake forms uniformly, is easily removed, and the funnel is easily cleaned. The stem 14 extends downwardly through a rubber stopper 18 into a flush reservoir 19, preferably having a concave bottom the stopper effecting a hermetic seal between the base 13 and the flush reservoir.

A collection vessel 20, of smaller diameter than the flush reservoir 19, and having an open top spaced below the lower end of the stem 14, is loosely positioned within the flush reservoir and can be tilted relative to the end of the stem extending into the reservoir so that its position is changed to receive or avoid receiving any particular filtrate flowing therefrom. In the latter event, the filtrate will drain into the flush reservoir proper. Where the bottom of the flush reservoir is concave, it is preferred that the collection vessel 20 pivotally rest on its bottom in the lower portion of the said concave bottom of the reservoir. Further, it is also preferred that the stem be positioned close to one of the walls of the flush reservoir so the distance from the stem to that wall is less than the diameter of the collection vessel while the distance from the stem to the opposite wall of the flush reservoir is greater than the diameter of the collection vessel. These features render the vessel tiltable relative to the end of the stem so that its position can be changed to receive or avoid receiving any particular filtrate flowing therefrom.

Means for tilting the collection vessel 20 to position it to receive or avoid receiving filtrate are provided in the form of a rocker having two similar legs 22 and 23 and two similar shorter legs 24 and 25. Legs 22 and 23 are positioned diametrically opposite to each other while legs 24 and 25 are also positioned opposite, but not diametrically, to each other approximately midway between legs 22 and 23. One end of each of the four legs is fixed to base 13. The free ends of legs 22 and 23, together with the free end of either leg 24 or 25, depending on the position of collection vessel 20, rest on a table 26 or other supporting surface, the remaining leg being elevated off the table. Thus, when it is desired to collect a particular filtrate, the vacuum filter is rocked so that legs 22, 23, and 24 rest on table 26. This movement tilts the collection vessel 20 to a position directly under stem 14 to receive the filtrate flowing therefrom. If it is desired to avoid collecting any particular filtrate flowing from the stem 14, the vacuum filter is rocked so that legs 22, 23, and 25 rest on table 26. This movement tilts the collection vessel to a position in which it is no longer directly under stem 14 and is thereby unable to receive filtrate flowing therefrom which, instead, flows into the flush reservoir 19 proper.

Means are also provided for evacuating the flush reservoir, as for example, a pump, shown as a suction bulb 30, one-way valves 31 and 32, and evacuating pipe 33 one end of which extends through base 13 into the flush reservoir while the other end communicates through valve 31 with suction bulb 30. Valve 31 is a hollow cylindrical tube having a transverse hole 34 loosely covered by a thin rubber sleeve 35. Valve 32 is similar to valve 31 and has a transverse hole 36 and a rubber sleeve 37.

When the suction bulb is compressed, closure of valve 31 is effected by rubber sleeve 35 sealingly covering hole 34, while, at the same time, expulsion of air to the atmosphere through valve 32 is effected by the forcing of the air through hole 36 causing distension of rubber sleeve 37 with consequent leakage of the air.

When the suction bulb is released, closure of valve 32 is effected by rubber sleeve 37 sealingly covering hole 36, while, at the same time, opening of valve 31 is effected by the air being drawn through hole 34 causing distension of rubber sleeve 35 with consequent leakage of the air which is drawn into suction bulb 30.

The aforedescribed vacuum filter has particular application in agriculture where it finds use in the preparation of soil solution extracts for ultimate testing and analysis as to their salinity concentration. Since salinity is a common problem in irrigation agriculture causing reduced crop yields, the diagnosis of salinity conditions is important.

In the preparation of such soil solution extracts, a sample of the soil to be tested is placed in a container, and, with a spatula, stirred while adding distilled water until a saturated paste is obtained. At saturation, the soil paste glistens as it reflects light, flows slightly when the container is tipped, and slides freely and cleanly off the spatula for all soils but those with high clay content. After mixing, the soil paste is allowed to stand for an hour or more and the criteria for saturation described above are rechecked. Free water should not collect on the soil surface, nor should the paste stiffen markedly or lose its glistening appearance on standing. If the paste does stiffen or lose its glistening appearance, it should be remixed with more water.

Filtration of the soil paste is now carried out in the aforedescribed vacuum filter to obtain as filtrate a soil solution extract which can thereafter be analyzed for salinity. In preparing the vacuum filter for filtration, filter paper 15 is placed on base 13 within wall 12 of the filter funnel and the vacuum filter rocked to rest on legs 22, 23, and 25 thereby tilting the collection vessel 20 to a position in which it will avoid receiving filtrate from stem 14. The reason for beginning the filtration with the collection vessel in this position is due to the fact that the initial filtrate usually is turbid and contains suspended insoluble material. A filter cake of soil particles soon collects on the filter surface so that for most soils a clear filtrate is obtainable except at the start of the filtration process. Turbidity in the filtrate may seriously interfere with titrations for the determinations of calcium and magnesium, these tests being made to determine the alkali status of soil. Turbidity may also interfere with colorimetric determination of soluble nitrogen, phosphorus, and potassium.

After the collection vessel 20 has been so positioned to avoid receiving the turbid filtrate, the soil paste is placed on the filter paper and the flush reservoir evacuated through the medium of suction bulb 30 and valves 31 and 32 causing the turbid filtrate to flow through stem 14 and to drop into the bottom of the flush reservoir proper. The filtration is continued until the filtrate is no longer turbid whereupon the vacuum filter is rocked to rest on legs 22, 23, and 24, as shown in Fig. 2, thereby tilting the collection vessel 20 to a position for receiving the clear filtrate flowing thereafter from stem 14.

What is claimed is:

1. A vacuum filter comprising a filter funnel having a base for supporting filter paper and having a stem through which filtrate will flow and drop by gravity, a flush reservoir sealingly connected to said funnel, said stem extending downwardly into said flush reservoir, a collection vessel positioned within and of smaller diameter than said flush reservoir having an open top spaced below the lower end of said stem and tiltable relative to said stem so as to receive or avoid receiving any particular filtrate flowing from said stem, means for tilting said collection vessel to a position under or away from, said stem for respectively receiving or avoid receiving any particular filtrate flowing from said stem, and means for evacuating said flush reservoir.

2. The vacuum filter of claim 1 wherein the means for tilting the collection vessel comprise a supporting rocker for the filter funnel.

3. The vacuum filter of claim 2 wherein the rocker comprises four legs the upper ends of which are fixed to the filter funnel, two of said legs being positioned opposite to each other, and the other two legs being positioned opposite to each other about midway between said first pair of legs but being of shorter length than said first pair of legs, whereby the said vacuum filter can be rocked to rest on three of the four legs two of which are the longer legs, thereby causing the collection vessel to tilt to a position under, or away from, said stem where it can respectively receive or avoid receiving any particular filtrate flowing from the stem.

4. A vacuum filter comprising a filter funnel having a base for supporting filter paper and having a stem through which filtrate will flow and drop by gravity, a flush reservoir having a concave bottom and sealingly connected to said funnel, said stem extending downwardly into said flush reservoir, a collection vessel, of smaller diameter than said flush reservoir, having an open top spaced below the lower end of said stem, and pivotally resting on its bottom in the lower portion of the said concave bottom of the flush reservoir, whereby the collection vessel is rendered tiltable relative to said stem so as to receive or avoid receiving any particular filtrate flowing from said stem, means for tilting said collection vessel to a position under, or away from, said stem for respectively receiving or avoiding receiving any particular filtrate flowing from said stem, and means for evacuating said flush reservoir.

5. A vacuum filter comprising a filter funnel having a base for supporting filter paper and having a stem through which filtrate will flow and drop by gravity, a flush reservoir having a concave bottom and sealingly connected to said funnel, said stem extending downwardly into said flush reservoir, a collection vessel, of smaller diameter than said flush reservoir, having an open top spaced below the lower end of said stem, and pivotally resting on its bottom in the lower portion of the said concave bottom of the flush reservoir, the said stem being positioned close to one of the walls of the flush reservoir so that the distance from the stem to that wall is less than the diameter of the collection vessel while the distance from the stem to the opposite wall of the flush reservoir is greater than the diameter of the collection vessel, whereby the collection vessel is rendered tiltable relative to said stem so as to receive or avoid receiving any particular filtrate flowing from said stem, means for tilting said collection vessel to a position under, or away from, said stem for respectively receiving or avoiding receiving any particular filtrate flowing from said stem, and means for evacuating said flush reservoir.

References Cited in the file of this patent

UNITED STATES PATENTS

| 418,719 | Hepburn | Jan. 7, 1890 |
| 1,111,219 | Daugherty | Sept. 22, 1914 |
| 1,115,505 | Chapin | Nov. 3, 1914 |
| 1,160,629 | McMasters | Nov. 16, 1915 |
| 1,829,353 | Hogan | Oct. 27, 1931 |
| 2,449,238 | Lightfoot | Sept. 14, 1948 |

FOREIGN PATENTS

| 26,834 | Great Britain | Nov. 26, 1906 |
| 403,858 | Germany | Oct. 9, 1924 |
| 691,001 | France | Mar. 3, 1930 |
| 904,305 | France | Feb. 26, 1945 |